(12) United States Patent
Richarte et al.

(10) Patent No.: US 10,502,621 B2
(45) Date of Patent: *Dec. 10, 2019

(54) DYNAMIC HYPER-SPECTRAL IMAGING OF OBJECTS IN APPARENT MOTION

(71) Applicant: Urugus S.A., Montevideo (UY)

(72) Inventors: Gerardo Gabriel Richarte, Caba (AR); Agustina Pose, Caba (AR); Juan Manuel Vuletich, Provincia de BsAs (AR); Pablo Jais, Caba (AR); David Vilaseca, Caba (AR); Emiliano Kargieman, Buenos Aires (AR)

(73) Assignee: Urugus S.A., Montevideo (UY)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,832

(22) Filed: Dec. 27, 2017

(65) Prior Publication Data

US 2018/0180476 A1    Jun. 28, 2018

Related U.S. Application Data (60) Provisional application No. 62/439,388, filed on Dec. 27, 2016.

(51) Int. Cl.
| | |
|---|---|
| *G01J 3/02* | (2006.01) |
| *G01J 3/28* | (2006.01) |
| *G06K 9/00* | (2006.01) |
| *G06T 7/207* | (2017.01) |
| *G01J 3/04* | (2006.01) |
| *G06K 9/46* | (2006.01) |
| *G01J 3/26* | (2006.01) |

(52) U.S. Cl.
CPC .............. *G01J 3/0229* (2013.01); *G01J 3/04* (2013.01); *G01J 3/26* (2013.01); *G01J 3/2803* (2013.01);
(Continued)

(58) Field of Classification Search
CPC .......... G01J 3/0229; G01J 3/04; G01J 3/2803; G01J 3/2823; G01J 2003/2806;
(Continued)

(56) References Cited

U.S. PATENT DOCUMENTS 5,884,226 A * 3/1999 Anderson ............ G01N 21/538
702/3
2003/0193589 A1* 10/2003 Lareau ...................... G01J 3/02
348/294

(Continued)

FOREIGN PATENT DOCUMENTS

WO    WO2013109966    7/2013

OTHER PUBLICATIONS

PCT Search Report and Written Opinion dated Mar. 26, 2018, for PCT Application No. PCT/US17/68598, 10 pages.

*Primary Examiner* — Dominic J Bologna
(74) *Attorney, Agent, or Firm* — Lee & Hayes, P.C.

(57) ABSTRACT

Hyperspectral imaging systems and methods for hyperspectral imaging of scenes in apparent motion are described. Each acquired image includes a spatial map of the scene which facilitates pointing, focusing, and data analysis. The spectral measurement parameters can be configured dynamically in order to optimize performance such as spectral resolution, storage capacity, and transmission bandwidth, without physical or optical reconfiguration of the imaging system, and with no need for moveable mechanical parts. The system achieves high spectral and spatial resolution, is simple, compact, and lightweight, thereby providing an efficient hyperspectral imaging system for aircraft or spaceborne imaging systems.

19 Claims, 7 Drawing Sheets

(52) U.S. Cl.
CPC .......... *G01J 3/2823* (2013.01); *G06K 9/0063* (2013.01); *G06K 9/00771* (2013.01); *G06K 9/4609* (2013.01); *G06T 7/207* (2017.01); *G01J 2003/2806* (2013.01); *G01J 2003/2826* (2013.01); *G06K 2009/00644* (2013.01)

(58) Field of Classification Search
CPC ............. G01J 2003/2826; G06T 7/207; G06K 9/0063; G06K 9/00771; G06K 9/4609
See application file for complete search history.

(56) References Cited

U.S. PATENT DOCUMENTS

| | | | |
|---|---|---|---|
| 2005/0073734 A1* | 4/2005 | Verma .................. | G02B 26/001 359/260 |
| 2005/0094160 A1* | 5/2005 | Murai ................ | G01B 11/0625 356/630 |
| 2005/0104771 A1* | 5/2005 | Terry .................... | G01J 3/2823 342/195 |
| 2006/0197949 A1 | 9/2006 | Bouzid et al. | |
| 2007/0237374 A1* | 10/2007 | Nikiforos ............... | A61B 5/445 382/128 |
| 2008/0061222 A1* | 3/2008 | Powers .................. | B82Y 15/00 250/226 |
| 2009/0318815 A1* | 12/2009 | Barnes ................... | A61B 5/742 600/473 |
| 2013/0242131 A1 | 9/2013 | Timm et al. | |
| 2014/0378843 A1* | 12/2014 | Valdes .................. | G02B 21/06 600/476 |
| 2016/0345835 A1* | 12/2016 | Darty .................... | A61B 5/447 |

* cited by examiner

DYNAMIC HYPER-SPECTRAL IMAGING OF OBJECTS IN APPARENT MOTION

CROSS REFERENCE TO RELATED APPLICATION

This patent application claims the benefit of and claims priority to U.S. Provisional Patent Application Ser. No. 62/439,388 filed Dec. 27, 2016, entitled "DYNAMIC HYPER-SPECTRAL IMAGING OF OBJECTS IN APPARENT MOTION," which is hereby incorporated in its entirety by reference.

BACKGROUND

Multispectral imaging allows an imaging system to capture image information from across the electromagnetic spectrum. Many such systems operate by taking sequential images and positioning various filters between the source and the imaging sensor between each successive image. In general, these imaging systems are large and heavy, computationally intensive, complex, rely on moving parts, are relatively slow in taking successive images, or all of the above.

The process and equipment required for multispectral imaging becomes even more complex when the observed scene is in apparent motion, such as when the imaging device is on a moving platform. The complexity of the imaging systems and the inherent delay between successive images creates additional considerations when attempting to capture multispectral images of a scene in apparent motion.

Finally, the problems noted above become exacerbated when taking hyperspectral images of a scene from a moving platform. The systems capable of taking such images generally require complex mechanical assemblies and are large and heavy, which create additional complications with satellite-based systems, in particular. As the size of the satellite decreases, the noted difficulties become exacerbated due to the limited available power and volume of the satellite.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments include an imaging system, such as an aerial or satellite-based imaging system, having an imaging sensor, a multispectral or hyperspectral optical filter, and employing various computational algorithms in a processing unit (e.g., a processor or other logic circuit) to capture and process images of a scene in apparent motion by forming a multi-dimensional datacube.

Embodiments determine a tracking speed of an area imaging device (AID) (e.g., a type of image capture device) in the direction of apparent motion. A sampling distance is determined based upon the optical filter, the tracking speed, and/or the desired output to result in a multi-dimensional datacube in which n-tuples of spatial coordinates result in pixels having x, y, and λ values, where x and y represent two spatial dimensions of the scene and λ represents the spectral dimension comprising a range of wavelengths. The multi-dimensional datacube may contain spatial coordinates corresponding to tens, hundreds, or even thousands of spectral dimensions, thereby creating a multi-dimensional datacube that contains hyperspectral imaging data.

A region of interest of the scene is determined to enable a sufficient number of exposures while the scene apparently moves relative to the AID. Multiple partially overlapping exposures are captured by taking successive exposures with the AID. As the scene appears to move relative to the AID, various points in the scene are captured by different pixels of the AID as light reflected or radiated from the various points pass from one spectral band of the optical filter to another before reaching the imaging sensor of the AID. In some embodiments, a variable optical filter is positioned in the optical path between the AID and the scene of interest, and as the scene of interest moves relative to the AID, successive images are captured in which specific points of the scene are captured by the AID through various portions of the variable optical filter. The exposures in each successive image have a determined amount of overlap, which enables the exposures to be stitched together to form a multispectral, or hyperspectral, image of arbitrary length. Each segment of the image is exposed through desired spectral bands, or all bands as the case may be, of the multispectral or hyperspectral optical filter during successive images.

As used herein, a multispectral optical filter and a hyperspectral filter (or just filter), refers to an optical filter that allows various wavelengths of light to pass through portions thereof. For example, an optical bandpass filter may contain one or more regions of the filter configured to selectively transmit a portion of the electromagnetic spectrum while attenuating or reflecting other wavelengths. The one or more regions may be linear, that is, a linear bandpass filter may have discrete regions of the filter that allow a high transmission across narrow bandwidths while attenuating unwanted light to maximize image capture at the required wavelength. The spectral response of a linear bandpass filter can be adjusted simply by moving the filter's position relative to the light source, or where the imaging device is on a moving platform, moving the platform relative to the light source. A continuous variable optical bandpass filter is an example of a hyperspectral optical filter that can be utilized with embodiments described herein, wherein the range of spectral bandwidths having a high transmission varies continuously across the filter. Other examples of optical filters may be used with embodiments described herein and are contemplated herein as providing the features and benefits described. For instance, a notch filter, a filter that attenuates a narrow band of wavelengths, may be used with the systems and methods described herein. Similarly, an optical bandpass filter, one that allows a band of wavelengths to pass, may likewise be used. One or more filters may be used to selectively attenuate or pass desired frequencies to result in a spectral image having one or more spectrums of interest.

Some embodiments of the imaging systems and apparatuses described herein may be employed to take images of Earth or any other celestial object from satellites, such as satellites in Low Earth Orbit (LEO). In satellite embodiments, the imaging system may include a telescope and the AID may be placed at the focal plane of the telescope. The multispectral or hyperspectral optical filter may be attached directly to the AID, and therefore also be placed near the focal plane of the telescope.

The processes, systems, and devices described herein may be implemented in a number of ways. Example implementations are provided below with reference to the following figures.

The goal of spectral imaging is to measure the spectrum for each pixel in the image of a scene. As used herein, a pixel in the image of a scene refers to the light that is captured by an imaging device that represents a corresponding location within the scene. That is, as the light radiated or reflected from each area within a scene is captured by the addressable elements within the AID, the light will pass through a portion of the multispectral or hyperspectral optical filter and the spectrum for that particular area of the scene will be captured. When the light radiated or reflected from that particular area of the scene is captured by a different addressable element of the AID, it will pass through a different portion of the filter, and a different spectrum for that particular area of the scene may be captured.

In this sense, the intensity of light radiated or reflected by an object is measured in its image plane. The resulting measurements are represented as a set of n-tuples of spatial coordinates and spectral magnitudes. These n-tuples are combined to form a multi-dimensional (x, y, λ) datacube for processing and analysis, where x and y represent two spatial dimensions of the scene, and λ represents the spectral dimension comprising a range of wavelengths. From a data processing viewpoint, spectral imaging can be characterized by the dimensionality of the datacube.

According to some embodiments, an apparatus is provided for imaging a scene that has apparent motion. The apparent motion may be due, at least in part, to a moving platform upon which the imaging apparatus is mounted, or may be due to the scene moving, or both. In some instances, the imaging apparatus is on board a moving platform, such as a spacecraft, satellite, or airborne platform. Additionally, the scene may also be moving, such as due to the rotation of the earth. Similarly, the imaging apparatus may also capture image data of other celestial bodies, such as a moon, planet, or star.

The apparatus includes an area imaging device having a plurality of pixel sensors and a multispectral or hyperspectral filter disposed within an optical path of the area imaging device. A control module connected to the area imaging device is able to determine a spatial region of interest of a scene to be captured by the area imaging device. A spatial region of interest is simply an area for which it is desirable to capture imaging data. For example, a forest, a lake, a farm, an ocean, a parking lot, a city, and a vehicle, are all examples of spatial regions of interest. The control module may determine the spatial region of interest autonomously. For example, where image analysis results in a feature of interest, the control module may determine that additional images should be captured of one or more features detected within a previously captured and analyzed image. The spatial region of interest may additionally be specified in an instruction received by the control module from a remote location, such as a ground station, or a satellite.

The control module may also determine a spectrum of interest of the scene. This may be accomplished, for example, by receiving an input from a rule or within an instruction to capture images. In some embodiments, the control module may execute a rule that indicates that when imaging data of plants is captured, that the spectrum of interest is selected to capture the spectral reflectance measurements acquired in the visible red and near infrared regions in order to calculate a normalized difference vegetation index ("NDVI"). Of course, other spectrums of interest or any other index derived from the imaging data are contemplated herein within the range of the imaging system.

The control module determines a sampling distance for successive image capture. The sampling distance may be based at least in part upon the hyperspectral filter and the spectrum of interest. In other words, as the scene apparently moves, each area of the scene will be captured through a different portion of the filter, so a different spectrum for each area of the scene will be captured through successive image captures. By determining a sampling distance, images of each area can be captured having the desired spectral information. In addition, where the filter is fixed with respect to the imaging sensor, there will be a known correlation between the spatial portion of the filter and the measured wavelength.

The control module directs the area imaging device to take one or more exposures at the sampling distance. Once the exposures are taken, an imaging module forms an image of the scene based at least on the one or more exposures.

In some embodiments, the imaging device, the control module, and the imaging module are on-board a satellite and image capture and processing is performed on-board the satellite. This alleviates bandwidth constraints with typical satellite imagery in which full resolution and full spectrum imaging data is transmitted to a ground station for post processing. By performing much of the image processing on board the satellite, the available bandwidth of the satellite downlink is used more efficiently. For instance, the satellite may perform image analysis, which may result in a number (e.g., the number of cars in a parking lot, the size of a body of water, a difference in size of a forest over time, etc.) to be stored and transmitted to a remote location, rather than the full spectrum imaging data.

In some instances, the hyperspectral filter is a continuously variable optical filter and the captured image may be a hyperspectral image.

In some embodiments, the sampling distance is determined such that the spatial region of interest of the scene is captured in the one or more exposures at the spectrum of interest. The imaging module may be configured to create an interpolation curve for each pixel across the one or more exposures.

In some cases, the imaging module is able to construct a monochromatic image by evaluating the interpolation curve for each pixel at the spectrum of interest.

According to some embodiments, a satellite includes an imaging device having a plurality of pixel sensors. The satellite may have a multispectral or hyperspectral filter disposed within an optical path of the imaging device. In some instances, any suitable spectral filter may be used. As used herein, a spectral filter is one that attenuates certain wavelengths or passes certain wavelengths. Hyperspectral filters, multispectral filters, bandpass filters, and notch filters are all examples of spectral filters.

The spectral filter may have at least a first spectral band and a second spectral band. In some cases, the spectral filter has a plurality of discrete spectral bands, and in other cases, the filter is a continuously variable optical filter.

The satellite may have one or more processors and memory along with programming instructions stored on the memory and executable by the one or more processors. The instructions may cause the processors to determine a spatial region of interest of a scene. This may be based upon rules or may be provided by an instruction sent via an uplink to the satellite. For example, instructions may be sent from a ground station, or from another satellite, that instructs the satellite to capture one or more images of a specified area with a specified spectrum.

The instructions further direct the imaging device to take at least one exposure of the scene when light radiated or reflected from the region of interest passes through the first spectral band, the second spectral band, or both. The instructions further cause the processors to generate an image of the scene based on the at least one exposure.

In some embodiments, the multispectral filter is fixedly mounted to the imaging device such that each of the plurality of pixel sensors is associated with a spectrum of the multispectral filter. The multispectral filter may be a continuously variable optical filter, in which case, where the plurality of pixel sensors are arranged in an array of rows and columns, a column of the pixel sensors will be associated with a common spectrum of the variable optical bandpass filter.

The instructions may further cause the one or more processors to determine a sampling distance for successive exposures and cause the imaging device to capture a first exposure and a second exposure separated by the sampling distance.

The first exposure may cause the spatial region of interest to be captured through the first spectral band and the second exposure may cause the spatial region of interest to be captured through the second spectral band.

The instructions may cause the processors to segment a first exposure to create a first portion of the first exposure having a wavelength of interest and segment a second exposure to create a second portion of the second exposure having the wavelength of interest. The first portion and the second portion may then be stitched to create an image having the wavelength of interest. By slicing up sequential images, the slices that exhibit the spectrum of interest may be stitched together to create an image of the scene having an arbitrary length with the spectrum of interest.

In some embodiments, the image having the wavelength of interest is a first image at a first wavelength and the instructions cause the processors to create a second image at a second wavelength. The images may be stored together by creating a hyperspectral cube containing the first image and the second image.

According to some embodiments, a method of operating an imaging system to image a scene having apparent motion includes providing an area imaging device having a multispectral or hyperspectral optical filter, determining a speed of the apparent motion of the scene, and directing the area imaging device to take a first exposure and at least one second exposure. The method may also include determining a sampling distance which can be based at least in part upon the speed of the apparent motion of the scene and the multispectral or hyperspectral optical filter. The first exposure and the second exposure can be used to create an image of the scene. In some instances, the speed of the apparent motion may be determined after images are captured. For example, images may be captured at a fixed number of frames per second (FPS) which will capture images across the spectral bands. After the images are captured, the images containing the spectral bands of interest may be saved or further processed, while other images not exhibiting the spectral bands of interest may be discarded.

In some cases, generating an image of the scene includes determining a spectrum of interest, segmenting the first exposure to create a first image slice having the spectrum of interest, segmenting the second exposure to create a second image slice having the spectrum of interest, and stitching together the first image slice and the second image slice to form an image of the scene having the spectrum of interest. In this way, slices of subsequent images can be selected that all exhibit the same spectrum of interest and stitched together to form an image having the spectrum of interest. By doing this with different spectrums of interest, the subsequent monochromatic images can be combined in a hyperspectral cube that may contain multiple images of the same scene, with each image having a different spectrum of interest.

In some embodiments, the multispectral optical filter has spectral bands and determining the sampling distance is based at least in part upon the speed of the apparent motion, the spectral bands of the multispectral optical filter, and a desired spectrum of interest.

In some cases, the imaging system is on board a spacecraft and the method further comprises compressing the image and transmitting the image to a ground station. The image compression may be done by storing monochromatic image data and discarding full spectrum image data. A first exposure may be used as an input to an image analysis algorithm. Executing the image analysis algorithm may return a numerical value, and the numerical value may be transmitted to a remote location. For example, an image analysis algorithm may be executed on imaging data associated with a parking lot. The algorithm may analyze the image and return the number of cars in the parking lot. The numerical value may then be transmitted to a remote location. The imaging data may not need to be transmitted, but can either be stored or discarded. Similarly, imagery of a road may allow the system to determine the number of vehicles that pass along the road over a given period of time. That is, successive images can be captured at a predetermined interval and the images can be analyzed to determine the number of unique vehicles that pass the imaged location. The system may, through the image analysis algorithm, count only the number of unique vehicles.

Figure 1A:
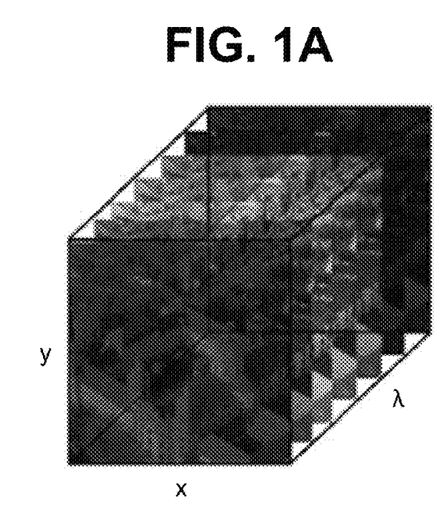
FIGS. 1A, 1B, 1C, and 1D illustrate a multi-dimensional datacube created by the snapshot hyperspectral technique, the spectral scanning technique, the spatial scanning technique, and the spatio-spectral scanning technique, respectively.
Figure 1B:
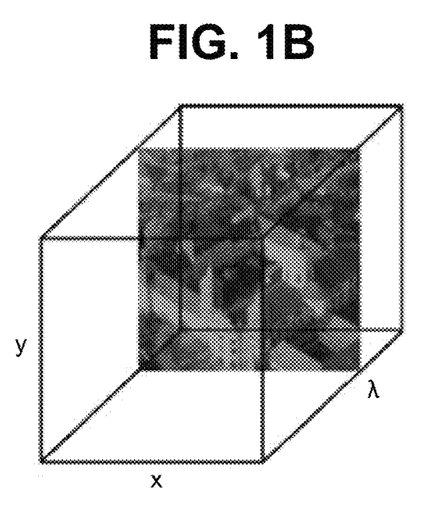

FIGS. 1a-1d illustrate multi-dimensional datacubes based upon various multispectral imaging techniques. Grusche, Sascha. *Basic slit spectroscope reveals three-dimensional scenes through diagonal slices of hyperspectral cubes* Applied Optics, OSA, June 2014. Retrieved on Jun. 9, 2014. As shown in FIG. 1a, a multi-dimensional datacube may comprise a plurality of planes having x and y values for each pixel and each plane may comprise a spectral dimension. The result is a multitude of monochromatic images. A monochromatic image, such as is illustrated in FIG. 1b, is one in which the spectral dimension ($\lambda$) of the datacube represents measurements of intensity in a single spectral band. The output corresponds to a bidimensional datacube, where the entire scene is mapped by a single wavelength, or a relatively narrow wavelength.

In an RGB image, the datacube has values for both spatial dimensions (x,y) and exactly three spectral bands corresponding to Red, Green and Blue. In multispectral imaging, the corresponding datacube comprises up to tens of spectral bands (which are generally relatively wide), usually covering different and even disjointed ranges of the spectrum. In turn, hyperspectral imaging can be characterized as the measurement of an object's radiance in a wide spectral range, and may comprise a continuous spectral range. It's representation on the (x,y,λ) space corresponds to a datacube with dozens, hundreds, or even thousands of spectral bands of a relatively small bandwidth, across the spectral dimension.

Characterization of spectral imaging may take into consideration the physical and optical features of the imaging system, such as spatial and spectral resolution, spectral range and bandwidth, and sensor characteristics, among others. However, it is also relevant to properly characterize the techniques by which the imaging systems make measurements and populate the datacube.

With reference to FIGS. 1a through 1d, various techniques for spectral imaging may be roughly classified in the following 4 groups: Snapshot hyperspectral techniques, Spectral scanning techniques, Spatial scanning techniques, and Spatio-spectral scanning techniques.

FIG. 1a shows a representative datacube resulting from snapshot imaging, wherein a single capture contains all spatial and spectral (x,y,λ) data. A single snapshot can be captured to include spectral data depending on the filters inserted into the optical path. Systems based on snapshot imaging return the full hyperspectral (x,y,λ) cube as a single sensor output. These devices have the advantage of requiring no scanning. However, these systems have the drawback of presenting high computational effort and manufacturing costs. Moreover, they are relatively complex systems and are typically quite heavy, which presents additional complications for satellite-based imaging systems.

As shown in FIG. 1b, the output of spectral scanning results in each captured frame representing a monochromatic, spatial (x,y) map of the scene. These devices are generally based on filters, which need to be tuned in order to spectrally scan the scene. Selection of the individual filter must be accomplished by electrical or mechanical means, in which case moving parts are required to physically insert a filter into the optical path. Higher exposure times (or faster optics) combined with the requirement of a stationary platform and/or a stationary object makes this technique less suitable for airborne or spaceborne spectral imaging systems. This type of imaging system requires multiple filters to be sequentially inserted into the optical path and subsequent exposures of the scene can populate the mutli-dimensional datacube with the spectral data of interest.

Figure 1C:
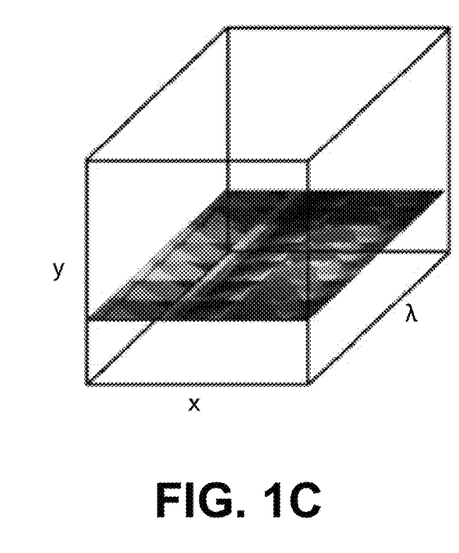

FIG. 1c illustrates the results of spatial scanning, in which each acquired frame corresponds to a full slit spectrum (x,λ). That is, each acquired frame includes a single row of pixels in the x direction along with the spectral data, λ. Examples of scanning devices are the push broom and point scanning spectrometers. These systems have the drawback of having the image analyzed per line and require moving parts in the case of the point scanner.

Figure 1D:
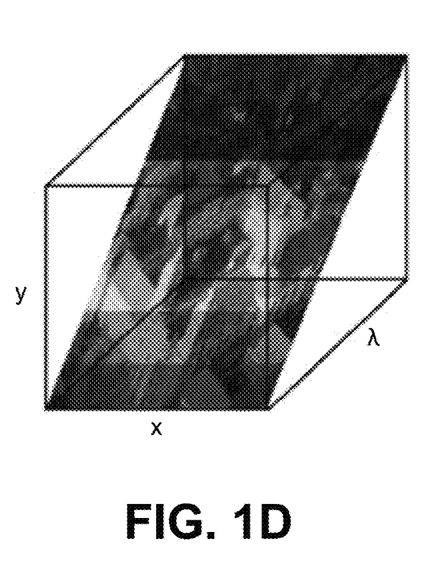

FIG. 1d illustrates the output of a spatio-spectral scanning system, wherein each 2-D sensor output corresponds to a slanted slice of the datacube, representing a spatial (x,y) map of the scene, with spectral information coded over one dimension. These devices have the advantage of allowing the use of either mobile or stationary platforms. However, these systems are usually difficult to achieve, presenting disadvantages such as high manufacture costs and complex mechanical assemblies.

Figure 2:
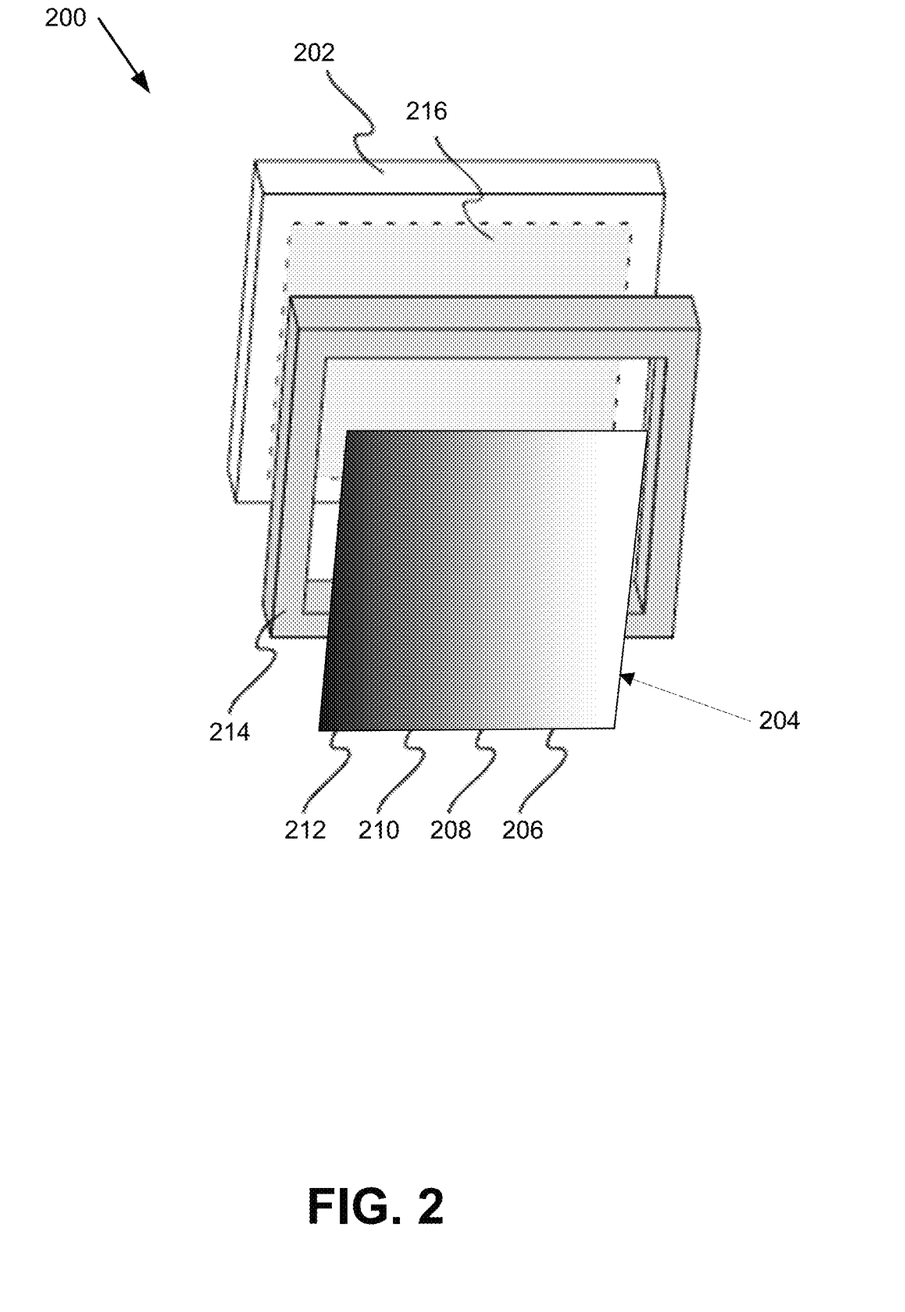
FIG. 2 illustrates a perspective view of a positional orientation of an optical filter in relation to an imaging sensor.

FIG. 2 illustrates an exploded view 200 of an area imaging device 202 and an optical filter 204 including variable filter bands 206, 208, 210, and 212 for use with an imaging device for scenes in apparent motion. Embodiments may have discrete filter bands, such as in the case of a striped filter, and the filter bands may be in any breadth or width, as desired. The optical filter 204 may additionally have as many as ten filter bands, such as in the case of a multispectral optical filter, or may have up to one hundred, or one thousand filter bands, or more, such as in the case of a hyperspectral optical filter. Alternatively, the filter bands may vary continuously across the optical filter 204 so that no discrete bands are present. A frame 214 holds the optical filter 204 in place, and may be positioned over the AID 202.

Filter bands are selected to cover desired fractions of the electromagnetic spectrum, and embodiments are not limited to any particular band or bands. The filter bands 206-212 may include, for example, ultraviolet, blue, green, red, and infrared bands, with another band of unfiltered coverage (i.e., a panchromatic band). The number of filter bands, and the spectral transmission of each filter band 206-212 are chosen to acquire any combination of wavelengths of interest. The filter bands 206-212 may be absorption filters, interference filters, or other kind of filters.

In some embodiments of the optical filter 204 for use in satellites, such as in LEO satellites, the optical filter 204 is a linear variable optical filter in which the spectral properties of the filter vary continuously along one dimension of the filter. Accordingly, the center wavelength of an image captured of a subject can be adjusted by moving the filter or the subject in relation to the imaging sensor.

An active surface 216 of the AID 202 includes a plurality of pixel sensors, such as light-absorbing detectors, arranged in a two-dimensional or a three-dimensional array. The AID 202 may be of various types, such as for example a charge coupled device (CCD), complementary metal oxide semiconductor (CMOS) sensor, or other suitable architecture.

The optical filter 204 may consist of variable bandpass regions, with $\lambda_{central}$ in a range from $\lambda_{min}$ to $\lambda_{max}$ within the extension of the AID 202. Various combinations of optical filter 204 and AID 202 may be used to achieve related and desired functionality. The wavelength range, the wavelength variation shape (linear, cubic, continuous, etc.) and the spectral transmission of the filter can be chosen to acquire any combination of wavelengths, bandwidths and spectral distribution of interest.

A hyperspectral image may be accomplished by repeatedly imaging the scene at different positions (the optimal distance between images depends on the filter's specifications and desired results). That is, as the scene appears to move, sequential images are taken at predetermined steps (e.g., predetermined times during the apparent motion), depending on the speed of apparent motion, and the desired wavelength imaging data in combination with the characteristics of the optical filter.

Figure 3:
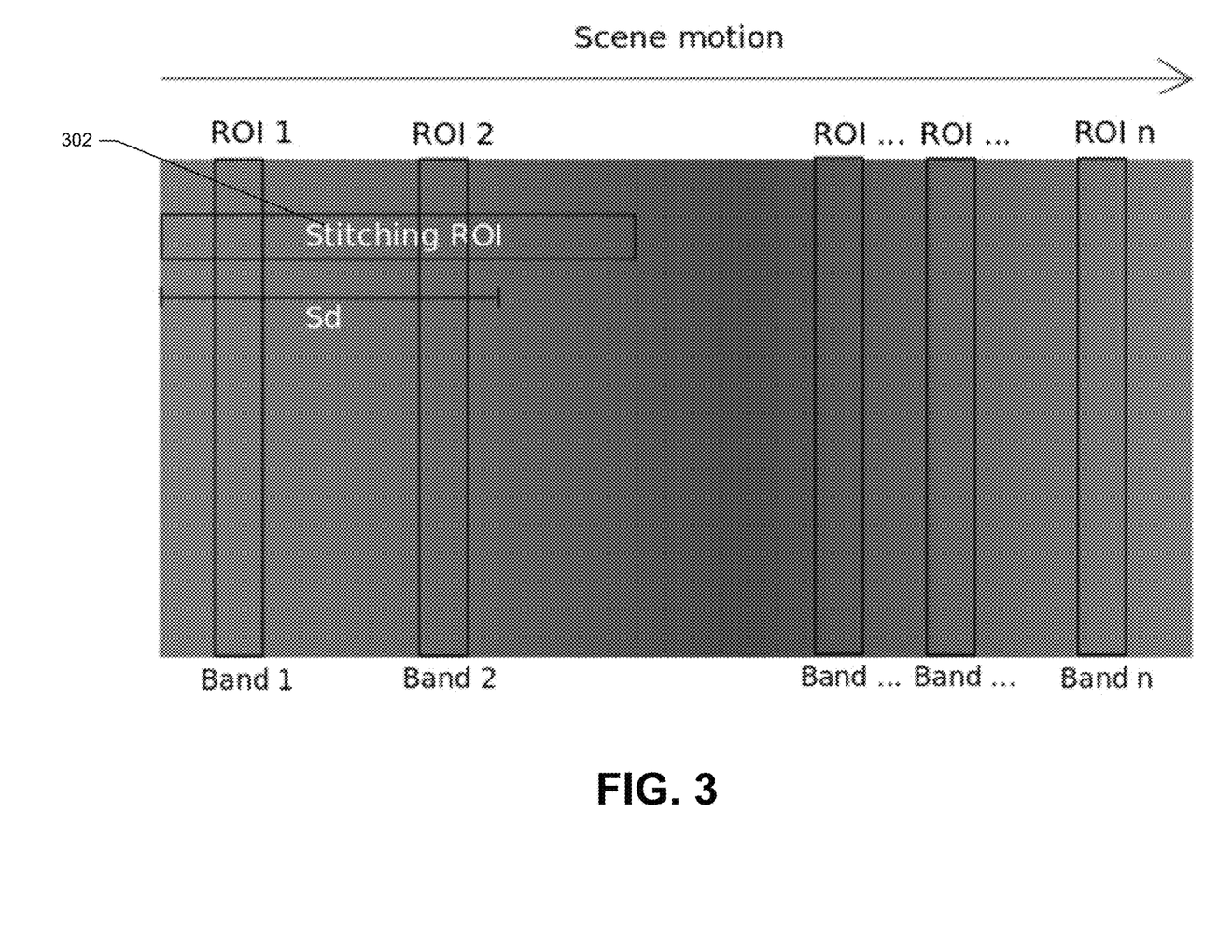
FIG. 3 illustrates a region of interest selection and stitching.
Figure 4:
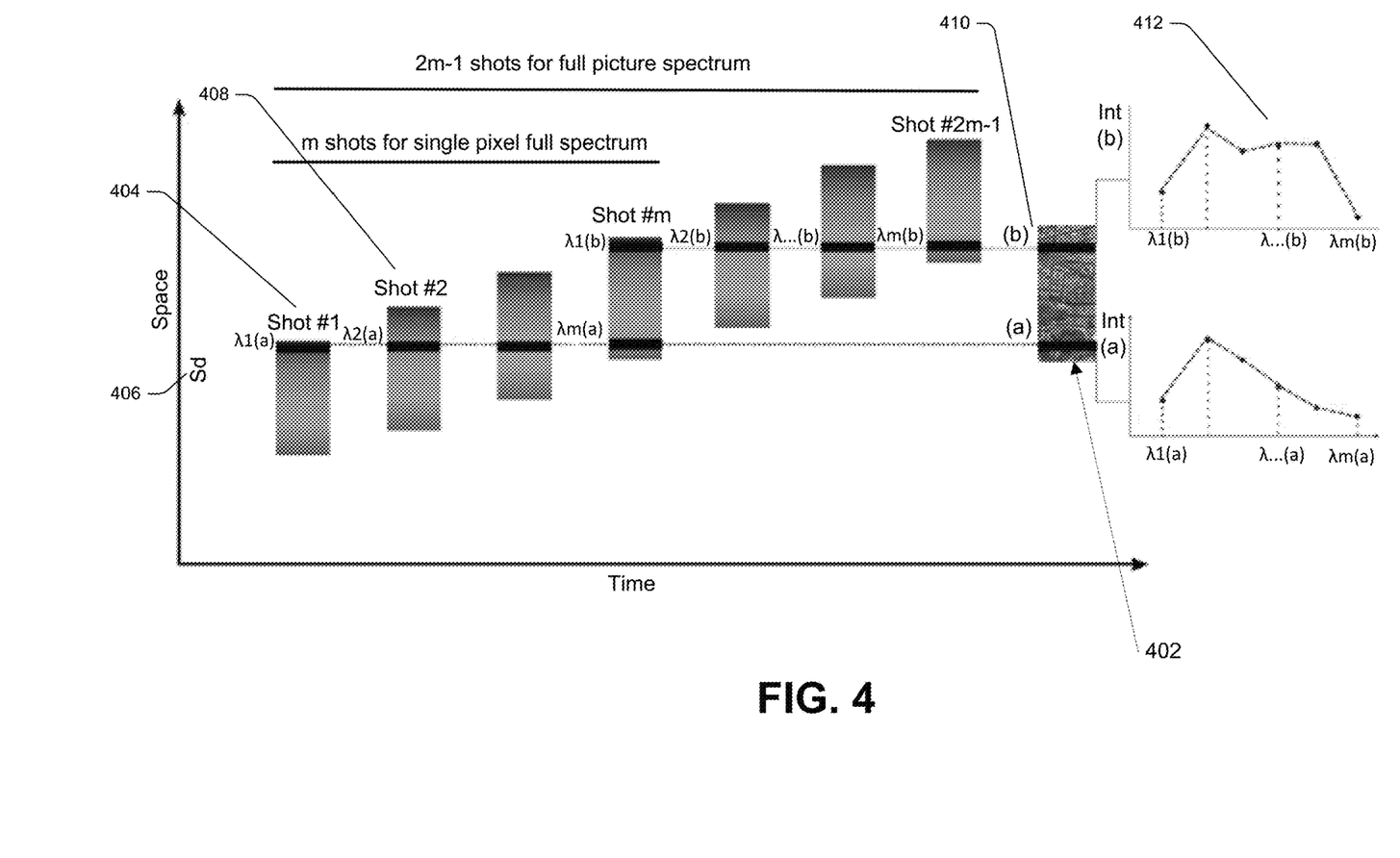
FIG. 4 illustrates apparent motion of the sensor with respect to the scene as sequential images of the scene are captured.

In order to determine the optimal step, or the sampling distance, it is necessary to take into account that the filter's full width half maximum (FWHM) may be different between $\lambda_{min}$ and $\lambda_{max}$. To acquire a full hyperspectral image, every pixel of the target scene should traverse the whole spectral range, hence the apparent motion of the scene with respect to the AID 202 must be at least twice the optical filter's length, as shown in FIGS. 3 and 4. That is, the AID 202 should capture sequential images of each portion of the scene of interest as light from the portions of the scene pass through the desired bands of the multispectral or hyperspectral optical filter before reaching the imaging sensor of the AID.

The system may be calibrated to optimize its performance. The calibration is largely dependent on the physical characteristics of the filter and the imaging sensor, and the precision of the alignment between them. Once the system has been calibrated, it can be operated for hyperspectral imaging without further need for re-calibration.

Given the optical setup, each pixel on the sensor corresponds to a particular wavelength. That is, light reaching each pixel on the sensor, will be spectrally filtered to a particular wavelength for each image captured. In order to reconstruct the scene for a given wavelength, it is necessary to know, for each pixel, the spectral band measured. When the bandwidth is known, this can be simplified into identifying the central wavelength ($\lambda_{central}$). In the case of a linear variable filter, for example, the calibration may be performed according to Equation 1:

$$\lambda_{central} = a*(N_{pixel}*ps) + b \quad \text{Equation 1}$$

Where $\lambda_{central}$ represents the central wavelength for a particular column of the sensor, a is the filter's wavelength variation per millimeter, $N_{pixel}$ is the number of the pixel column, ps is the pixel size, and b is the offset representing the relative position between the filter and the sensor, which may correspond to the wavelength measured by the first column of pixels, which is dependent upon the mechanical assembly of the multispectral or hyperspectral optical filter and the AID 202. In those embodiments in which the filter is not linearly variable, the calibration is still possible by implementing a solution tailored to a particular wavelength distribution.

For example, a possible calibration may consist of taking sets of pictures with a uniform and mostly monochromatic illumination. In this example, $\lambda_{central}$, $N_{pixel}$, and ps are known for each image. The filter parameters (in this example, the filter's wavelength variation per millimeter, α, and the offset, b) can be calculated by repeating this process for different illumination wavelengths.

Of course, when a non-linear variable filter is used, the calibration will be different. Once the filter parameters are known, the wavelength measured by each pixel can be automatically determined.

With an airborne, or spaceborne, AID 202, there may be transmission costs associated with capturing and sending an image of interest to a final destination. For example, in a spaceborne application, the image may be captured and any post processing done on board the spacecraft and the final image can be sent to a final destination, such as through a wireless communication mechanism, such as, for example, satellite communication, laser communication, or some other radio frequency type of wireless communication capability. In order to reduce the transmission costs and the amount of memory needed to store each image (which are important considerations in a satellite or other airborne or mobile platform), it is possible to take images with selected regions of interest (ROIs) of the AID 202 instead of acquiring an entire frame.

As illustrated in FIGS. 3 and 4, when the multispectral or hyperspectral optical filter is mounted in a static relationship to the imaging sensor, each pixel on the sensor corresponds to a particular wavelength of light received through the filter. Therefore, selecting a long thin ROI, which is substantially perpendicular to the motion of the platform, is equivalent to selecting a spectral band. If the spectral bands of interest are limited and known before the image is captured, it is possible to acquire only the ROIs that are associated with those spectral bands. This will return discrete spectral information instead of the whole continuous spectrum, as illustrated in FIG. 3. The selection of ROIs allows the AID 202 to gather the spectral data of interest while reducing the processing, transmission, and storage costs.

Once the spectral bands of interest are chosen and the corresponding ROIs of the AID 202 are calculated, the AID 202 can capture the required number of images at the correct time to result in the ROI having the desired spectral data. Of course, if the full spectrum is sought, the ROI can be equal to a full frame.

In capturing the ROI, several pictures can be taken and the information from each band of the filter is saved. Consecutive images may be processed together, such as by stitching, to obtain pictures of arbitrary length. Since all bands take pictures of the same scene, but displaced along an axis, consecutive images can be processed together to obtain a hyperspectral picture. Between each frame, the image will have moved so that a new segment of the scene will be projected on each filter's spectral band. The timing of this motion defines the displacement between consecutive images (referred herein as sampling distance), which may not be necessarily constant.

Pictures are taken every time the apparent motion of the scene with respect to the AID 202 approximately equals the desired sampling distance. The controller may instruct the AID 202 to capture images so that each picture is acquired at the proper time and position, as illustrated in FIG. 4.

FIG. 4 illustrates a space-time graph of capturing a multispectral image. For example, in order to capture region α 402, at 4 desired spectral bands, an initial frame is captured at shot 1 404. Once the speed of apparent motion is known and the characteristics of the optical filter are known, a sampling distance 406 can be determined. Once the scene has moved across the imaging sensor by the sampling distance 406, shot #2 408 is captured. As can be seen, shot #2 408 now captures region α 402 through a different band of the multispectral or hyperspectral optical filter, and therefore captures a different wavelength of region a as compared to shot #1 404. The sampling distance 406 need not remain constant between subsequent shots, but rather, can be determined based upon the desired wavelength data for each capture.

As can be seen from FIG. 4, in order to capture an entire spectrum of a scene, such as region α 402, the distance of apparent motion of the scene must be at least equal to the length of the filter. However, to capture an entire spectrum of an initial field of view of the AID 202, the distance of apparent motion of the scene should be equal to at least twice the length of the filter, as illustrated in FIG. 4 by the capture of regions α 402 and b 410.

Figure 5:
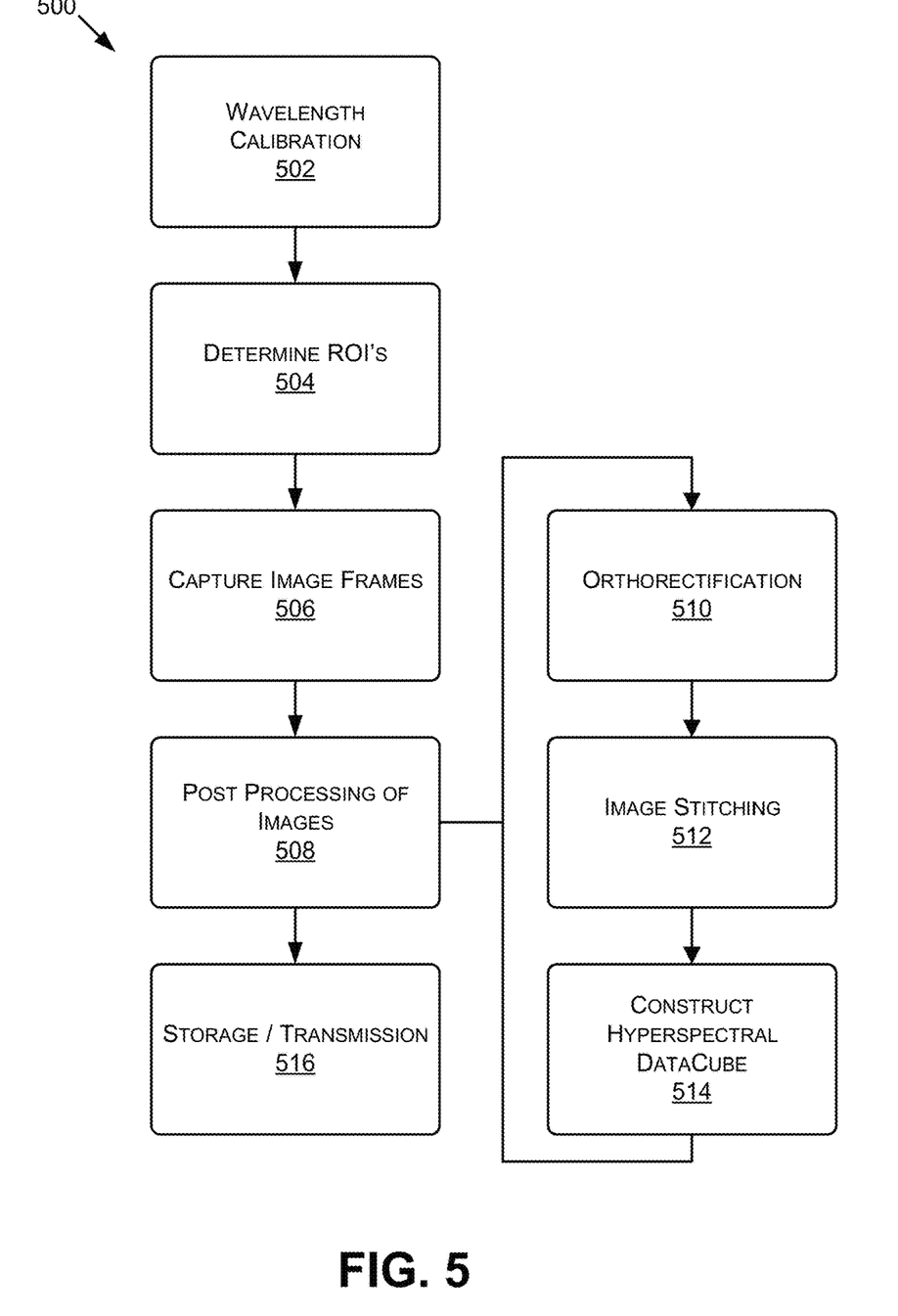
FIG. 5 is a block diagram illustrating the process of capturing a hyperspectral image.

FIG. 5 depicts a flow graph that shows an example process in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), in a programmable logic device, such as a field programmable gate array (FPGA), or other device. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

FIG. 5 is a flow diagram showing an example overview process 500 for hyperspectral image capture using an imaging device for scenes in apparent motion. At 502, wavelength calibration can be initiated. It should be noted that this may be a one-time setup step upon initial activation of the imaging device, or may be repeated on occasion, but is not a necessary step for each image capture operation of the AID 202. At 504, the ROIs are determined, and may include full spatial and spectral imaging, or may include specific spatial coordinates and/or spectral data.

At 506, the image frames are captured according to the spatial and spectral requirements of the determined ROIs. The image frames are captured as sequential images taken by the AID 202 as the field of view of the AID 202 passes the region of interest, and light reflected from the region of interest passes through the desired band of the multispectral or hyperspectral optical filter on its way to the imaging sensor of the imaging device.

At 508, the images are post processed in order to create the image of interest. For example, at 510, the images are orthorectified, such as by removing deformations given by the topographic profile of the natural land.

At 512, the frames are stitched together to form an image of desired size representing an area captured by the imaging device.

At 514, the hyperspectral datacube is constructed which contains the spatial and spectral data for each pixel of the imaging device, and may include at least x, y, and λ data for each pixel represented r within the cube. In some instances, the hyperspectral datacube may be sliced for discrete partitioning to aid in more efficient storage and transmission, thereby only containing the spatial and/or spectral data of interest.

At 516, the hyperspectral datacube is stored and/or transmitted to another destination. Of course, the process illustrated herein may be carried out by computing resources carried within the AID 202, or within the mobile platform of the AID 202. In other embodiments, the processing may be carried out by ground-based image processing resources, or a combination of resources located both at the imaging platform and a remote location.

While the illustrated figure shows that post processing of images 508 may be performed prior to storage 516 of the images, in some cases, the captured images may be stored prior to post processing, and post processing may be performed at a later time.

With further reference to FIG. 5, the post-processing techniques may be divided into three different phases: orthorectification, image registration, and construction of the hyperspectral cube.

An orthorectification algorithm can be applied to each separate frame, such as to remove any internal or external distortions to assign more accurate coordinates to the final image. This algorithm corrects the deformations given by the topographic profile of the natural land and allows reconstructing the orthogonal perspective of the image.

One of the inputs into the orthorectification algorithm may be the spectral data of each pixel, which may be necessary to correct for distortions influenced by the spectral band through which the image was captured. A spectral calibration may have previously been made on earth, such as during a calibration phase of implementing the imaging system. This calibration returns a matrix shaped as the sensor, indicating the wavelength band measured by each pixel (in simple applications a central wavelength is enough as previously discussed), which may be stored as part of the imaging system, or at some other external location for post processing after the images are transmitted from the imaging platform.

The orthorectification algorithm "deforms" the spatial information contained in each frame. In order to correctly reproduce the wavelength measured by each pixel, it may be preferable to apply the same transformation the wavelength matrix obtained as the output of the calibration. In this way, each orthorectified frame comes with its corresponding rectified wavelength matrix.

Image stitching 512 consists of aligning a plurality of consecutive images acquired by the sensor into a single full image with increased spectral information. The registration algorithm usually consists of finding matching features in each image, obtaining their displacement and rotation, applying the displacement and rotation to the full image, and blending both images where they overlap. The approximate displacement between images is predetermined based upon the desired sampling distance. In many embodiments, the imaging platform does not rotate during image capture, and thus, and no significant rotation is expected for many implementations, which vastly reduces the computation time needed to perform image registration as compared to capturing images from a rotating platform.

If the AID 202 is set to capture long thin ROIs instead of full frames (which may occur when the spectral bands of interest are limited), it may also be convenient to acquire an extra thin ROI perpendicular to the ones previously set, as shown in FIG. 3 at 302, in order to simplify the registration algorithm. The extra ROI should be long enough to show an overlap between consecutive frames, that is, it should be longer than the sampling distance.

Construction of the hyperspectral cube results in the imaging data, including x, y, and λ values for each pixel captured by the AID 202. During the hyperspectral imaging process, each pixel of the AID 202 is always measuring the same wavelength in those embodiments in which the multispectral or hyperspectral optical filter is mounted statically with respect to the imaging device. The raw frames may be corrected individually by taking into account the responsivity of the sensor and the transmissivity of the filter per wavelength. Since pictures will be taken every time the apparent motion of the scene with respect to the AID 202 equals the desired sampling distance (sd), each pixel from the scene will be spectrally sampled also at this distance, as shown in FIGS. 3 and 4. The number of images required to measure the full spectrum of a single scene's pixel (m) is equal to the total length of the filter divided by the sampling distance according to Equation 2:

$$m = \frac{(\lambda_{max} - \lambda_{min})}{sd} \quad \text{Equation 2}$$

For sake of example, if we assume that the scene's spectrum varies smoothly, an interpolating curve 412 can be calculated for each pixel on the scene, such as an interpolating polynomial or spline. The curve interpolation points can be obtained by computing the scene's irradiance for the different wavelengths measured by each pixel on the AID 202. Each interpolating curve will have m different interpolation points.

Figure 6:
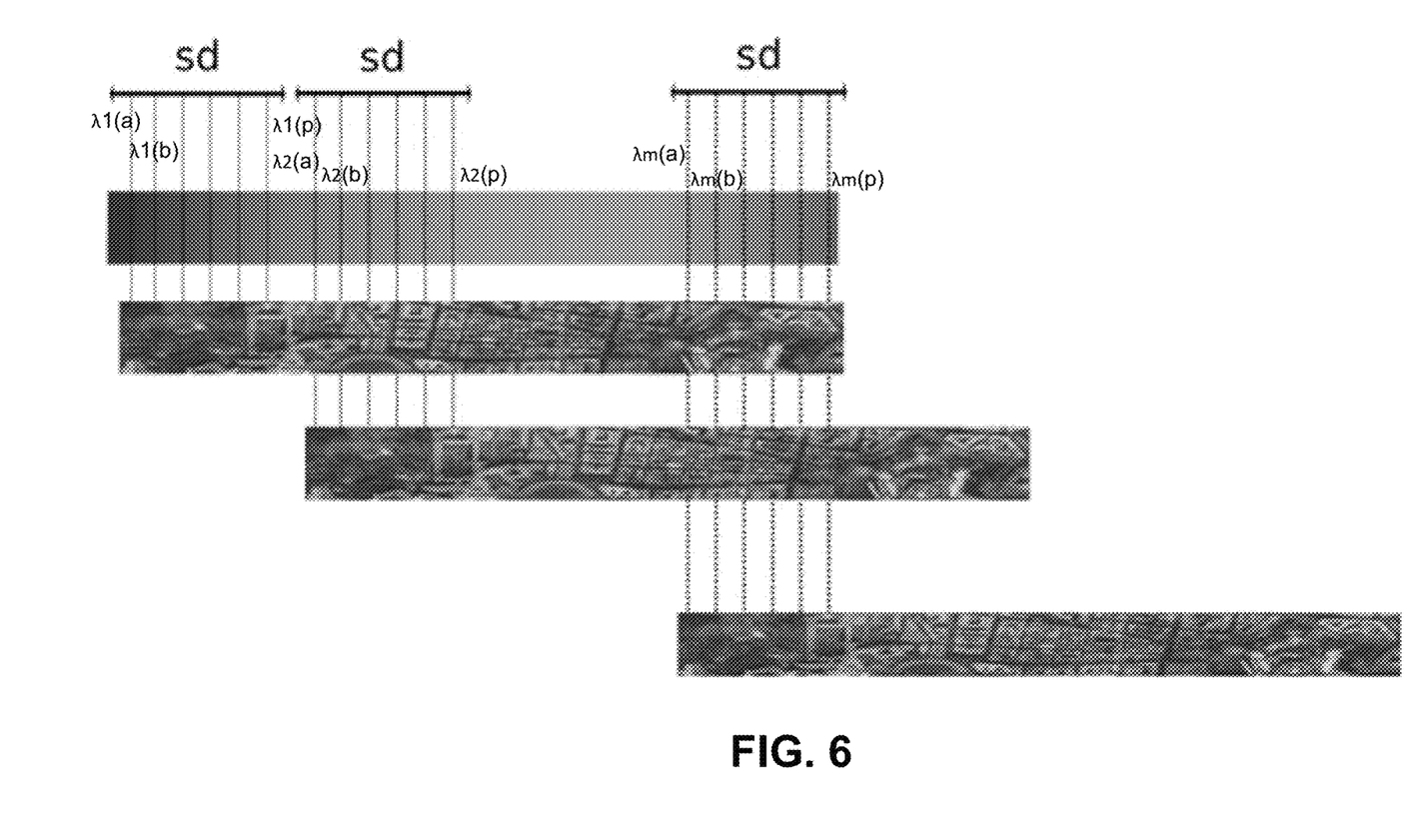
FIG. 6 illustrates points of the scene being captured through different portions of a multispectral optical filter through sequential images.

The sampling distance may be larger than one pixel, which results in each pixel on the scene projected within this distance to be sampled by a different group of central wavelengths. This is shown in FIG. 6, where there are p pixels measured by different spectral bands within the sampling distance. As a consequence of this, the interpolating curve for each one of these p pixels is built with a different group of interpolating points (given that the scene's irradiance is computed for different wavelengths).

Accordingly, each interpolating curve is built with m interpolation points, and there are p different groups of central wavelengths used as interpolation points. Once the interpolating curve of each pixel is calculated, the reconstruction of a monochromatic image may be performed by evaluating each pixel's curve at the desired wavelength.

Depending on the smoothness of the scene's irradiance spectrum, it is possible to regulate the degree of compression of the spectral information coded in the hyperspectral cube, by changing the degree of the interpolating polynomial when used. If the spectrum is smooth enough, for example, a low order polynomial can be chosen in order to compress the amount of information. Otherwise, if the spectral signatures vary widely, a high order polynomial can be chosen to interpolate the spectral data.

This algorithm represents a very low computational effort, enabling a great deal of information to be processed at very high speed. The algorithm presented here is based on the assumption that the scene's spectrum varies smoothly, without showing any kind of discontinuities. However, where the actual scene varies beyond a predetermined threshold from this assumption, the precision of the image processing can be increased such as by reducing the sampling distance and/or applying a different spectral reconstruction algorithm.

Once the pictures are taken and the data is processed, the information is stored and, in the case of remote sensing such as by a satellite or other airborne platform, eventually transmitted to another destination. Depending on the desired information contained within the datacube, it is possible to choose the structure of the information being stored. If full resolution is sought, the entire hyperspectral datacube can be stored, retaining full spatial and spectral resolution. On the other hand, if full resolution is not necessary, the hyperspectral cube may be compressed before storing it. Moreover, if the spectral bands of interest are limited, only a portion of the datacube, such as one or more slices, may be stored and/or transmitted that correspond to the desired spectral bands.

In other instances, the spectral information from each pixel may be processed in order to calculate different kind of indices, such as a normalized difference vegetation index (NDVI), or other green indices in the case of agriculture analysis, for example. Where specific spectral bands are desired, a monochromatic image along with the corresponding indices per pixel may be stored without storing the entire spectral signature for each pixel.

In this way, it is possible to tailor the data structure and information used to the specifics of a particular application in order to optimize the storage and transmission requirements.

In one embodiment, an AID is carried by a low earth orbit satellite. The orbit of a LEO satellite may be, for example, 700 km high in a typical situation. At this altitude, the orbital period is 98 minutes and 37 seconds and the projected velocity on the ground is 6764 m/s. A telescope may be, for example, a Cassegrain with an aperture diameter of 30 cm and a focal length of 2.5 m. Thus, each meter on the ground will be projected as a 3.6 µm image on the focal plane, and will be moving at 24.2 mm/s. Finally, if the imaging device has a multispectral optical filter having five discrete filter bands and an imaging sensor having 2000×2000 pixels, each 5 µm in width, then the sampling distance can be set to approximately less than 2000 µm such that each portion of the scene is captured at least once through each filter band, at a rate of about one image capture every 80 milliseconds. Of course, the sampling distance may be set differently depending on the characteristics of the filter and the speed of the apparent motion.

Figure 7:
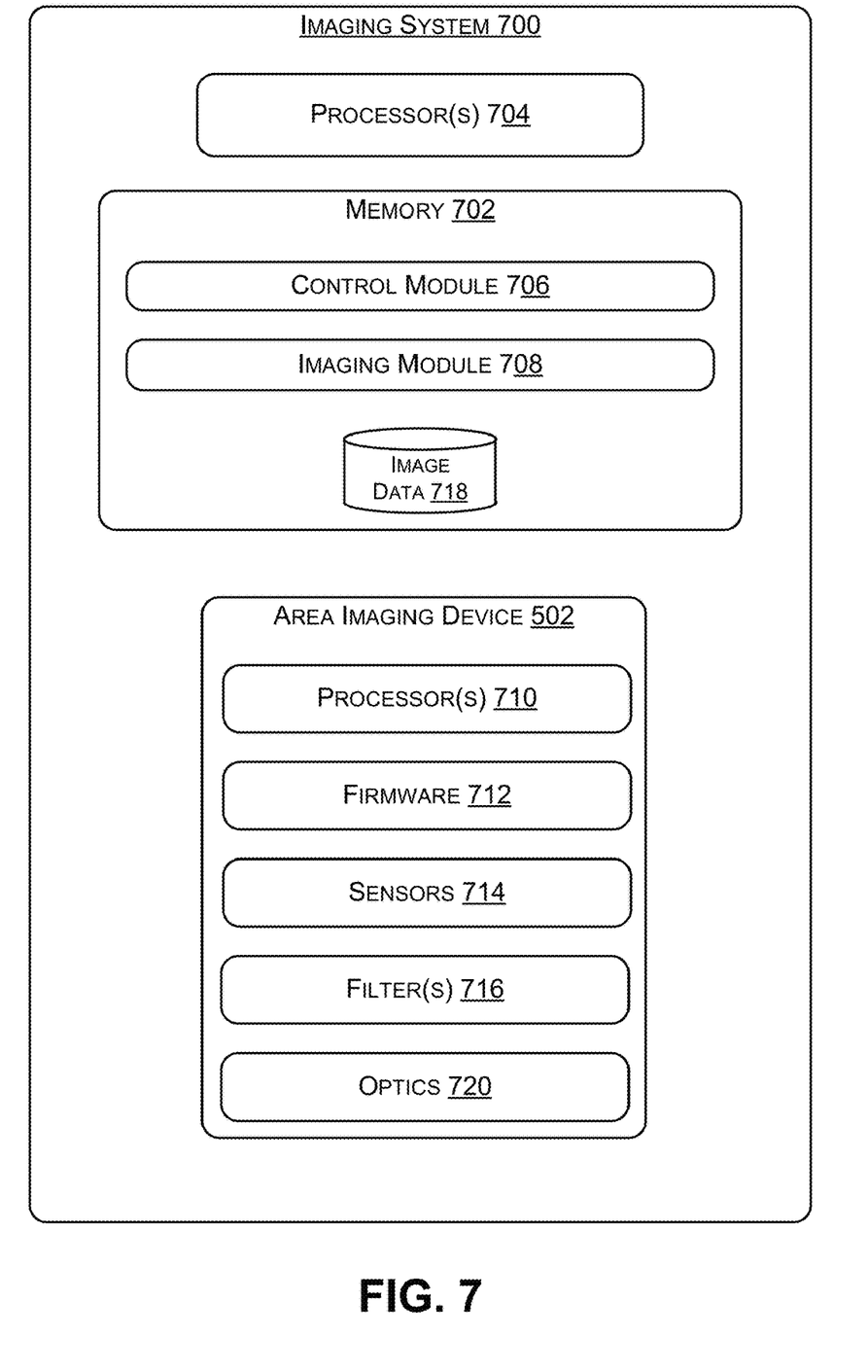
FIG. 7 is a block diagram of an example imaging system.

FIG. 7 is a block diagram of an example imaging system 700 usable to create hyperspectral images of scenes having apparent motion. The imaging system 700 may be all or partially on-board an aircraft or spacecraft, such as a satellite, such as a LEO satellite. In some embodiments, some of the components of the imaging system 700 may be ground-based or on-board a separate aircraft or spacecraft, with such ground-based or separate aircraft or spacecraft in communication with the system that includes the actual optics systems (such as a telescope and the AID 202, among other things). The imaging system 700 may be configured as any suitable computing device or system. Memory 702 may store program instructions and program modules that are loadable and executable on one or more processor(s) 704, as well as data generated during execution of, and/or usable in conjunction with, these programs, such as image data, images, and so forth.

Memory 702 includes at least a control module 706 and an imaging module 708. The control module may perform some or all of the control functions associated with capturing images in accordance with embodiments of the present disclosure. The control module 706 is executable by the one or more processors to control, such as through one or more input/output interfaces, The control module 706 is executable by the one or more processors 704 to control, such as through one or more input/output interfaces, the AID 202. The AID 202 may be controlled to capture one or more exposures, such as synchronized with the sampling distance to capture exposures through the desired spectrum of the multispectral or hyperspectral optical filter according to various embodiments of the present disclosure.

The area imaging device 502 may include one or more processors 710 and firmware 712 (stored on a suitable, non-transitory computer-readable storage medium) to perform or otherwise control various functions of the AID 202. The firmware 712 may be executable by the one or more processors 710 to control exposure times, time the exposure capture, determine sampling distances, store image data 718 on the memory 702, and so forth.

The AID 202 also includes light-sensitive sensors 714, such as for example, semiconductor components suitable to implement a charge coupled device (CCD), a complementary metal oxide semiconductor (CMOS) sensor, or other suitable sensor architecture on the active surface 216 of the AID 202.

One or more filter(s) 716 are provided, as discussed herein, to allow for hyperspectral imaging. Optics 720, such as, for example, any suitable lens and/or telescope, may be provided to focus light reflected or radiated from a region of interest onto the sensors 714.

The imaging module 708 performs various image processing functions of the imaging system 700, including tone mapping to generate HDR images, a resolution enhancement algorithm to produce high-resolution images, and a stitching algorithm to generate images from multiple partially overlapping exposures, as well as other processing functions, such as blur removal, artifact removal, color enhancement, cropping, image conversion, image compression, data encryption, and so forth.

In some embodiments, the firmware 712 of the AID 202 may be considered as an extension of one or both of the control module 706 and the imaging module 708, with some or all of the functions of the control module 706 and/or the imaging module 708 performed on or by the firmware 712, executing on the one or more processors 710. In some embodiments, some or all of the functions of the control module 706, the imaging module 708, and/or other functions of the firmware 712 may be implemented as logic functions on the one or more processors 704. For example, in some embodiments, the one or more processors 704 may include an application-specific integrated circuit (ASIC), a programmable logic device, such as a field programmable gate array (FPGA), or other logic circuit to perform various functions, including various control functions of the control module 706 and/or the image processing functions of the imaging module 708.

Depending on the configuration and type of computing device used, memory 702 of the imaging system 700 as well as the media for storing firmware 712 in the AID 202, may include volatile memory (such as random access memory (RAM)) and/or non-volatile memory (such as read-only memory (ROM), flash memory, etc.). Memory 702 as well as the media for storing firmware 712 in the AID 202, may also include additional removable storage and/or non-removable storage including, but not limited to, flash memory, magnetic storage and/or optical storage, and/or tape storage that may provide non-volatile storage of computer-readable instructions, data structures, program modules, and other data for imaging system 700.

Memory 702, as well as the media for storing firmware 712 in the AID 202, is an example of non-transitory computer-readable media. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

According to other embodiments, an AID may include multiple image capture devices, such as multiple CCD or CMOS sensors, which may each have a respective bandpass optical filter, which may be multispectral or unispectral. The multiple image capture devices may be disposed in a linear relationship one to another, and further oriented such that a line drawn through the row of image capture devices is parallel to the direction of apparent motion. As such, to capture an image of a region of interest, the image capture devices can be actuated in succession to capture multiple images of the region of interest, with each capture containing the spectral data according to the configuration of each image capture device. The timing of the sequential actuation of the image capture devices can be determined based upon the speed of apparent motion, the characteristics of the image capture devices, and the spatial relationship of the multiple image capture devices to one another. The multiple images can then be overlaid to create a multispectral or hyperspectral image or stored together in a multispectral data cube.

Based upon embodiments described herein, an imaging system can capture hyperspectral images of a scene in apparent motion by implementing a hyperspectral optical filter and capturing sequential images as the scene passes by the hyperspectral optical filter. The system does not require changing filters in between successive exposures, and in fact, doesn't require any moveable components. The multispectral datacube can be configured at image capture time in order to collect only the spatial and or spectral regions of interest, allowing for dynamic configuration of the imaging device. It is relatively simple in comparison with existing hyperspectral imaging systems, which makes it a dramatically improved solution for spaceborne hyperspectral imaging.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. An apparatus for imaging a scene having apparent motion, the apparatus comprising:
   an area imaging device having a plurality of pixel sensors;
   a hyperspectral filter disposed within an optical path of the area imaging device;
   a control module configured to:
      determine a spatial region of interest of a scene to be captured by the area imaging device;
      determine a spectrum of interest of the scene;
      determine, based at least in part upon the hyperspectral filter and the spectrum of interest, a sampling distance for successive image capture; and
      direct the area imaging device to take one or more exposures at the sampling distance; and
   an imaging module configured to form an image of the scene based at least on the one or more exposures.

2. The apparatus of claim 1, further comprising a satellite and wherein the area imaging device, the control module, and the imaging module are on-board the satellite.

3. The apparatus of claim 1, wherein the hyperspectral filter is a continuously variable optical filter.

4. The apparatus of claim 3, wherein the image is a hyperspectral image, and the hyperspectral image is transmitted to a ground-based station from a moving platform.

5. The apparatus of claim 1, wherein the sampling distance is determined such that the spatial region of interest of the scene is captured in the one or more exposures at the spectrum of interest.

6. The apparatus of claim 1, wherein the imaging module is further configured to create an interpolation curve for each pixel across the one or more exposures.

7. The apparatus of claim 6, wherein the imaging module is further configured to construct a monochromatic image by evaluating the interpolation curve for each pixel at the spectrum of interest.

8. A satellite comprising:
an imaging device having a plurality of pixel sensors;
a spectral filter disposed within an optical path of the imaging device, the spectral filter having at least a first spectral band and a second spectral band;
one or more processors;
a memory; and
programming instructions stored on the memory and executable by the one or more processors to perform acts including:
determining a spatial region of interest of a scene;
determining a spectrum of interest;
determining, based at least in part upon the spectrum of interest, a sampling distance for successive exposures;
directing the imaging device to take at least one exposure of the scene when light reflected from the spatial region of interest passes through the first spectral band and/or the second spectral band, wherein the first spectral band and/or the second spectral band correspond to the spectrum of interest;
causing the imaging device to take the successive exposures separated by the sampling distance; and
generating an image of the scene based on the at least one exposure and/or the successive exposures.

9. The satellite of claim 8, wherein the spectral filter is fixedly mounted to the imaging device such that each of the plurality of pixel sensors is associated with a spectral band of the spectral filter.

10. The satellite of claim 9, wherein the spectral filter is a continuously variable optical filter, the plurality of pixel sensors are arranged in an array of rows and columns, and each column of the pixel sensors is associated with a spectral band of the continuously variable optical filter.

11. The satellite of claim 8, wherein the at least one exposure causes the spatial region of interest to be captured through the first spectral band and at least one of the successive exposures causes the spatial region of interest to be captured through the second spectral band.

12. The satellite of claim 8, wherein the programming instructions cause the one or more processors to perform further acts comprising:
segmenting a first exposure to create a first portion of the first exposure having a wavelength of interest,
segmenting a second exposure to create a second portion of the second exposure having the wavelength of interest; and
stitching together the first portion and the second portion to create an image having the wavelength of interest.

13. The satellite of claim 12, wherein the image having the wavelength of interest is a first image at a first wavelength and the programming instructions cause the one or more processors to perform further acts comprising creating a second image at a second wavelength and creating a hyperspectral cube containing the first image and the second image.

14. A method of operating an imaging system to image a scene having apparent motion, the method comprising:
providing an area imaging device having a multispectral optical filter;
determining a speed of the apparent motion of the scene;
determining a sampling distance, the sampling distance based at least in part upon the speed of the apparent motion of the scene and the multispectral optical filter;
directing the area imaging device to take a first exposure and at least one second exposure at the sampling distance; and
generating an image of the scene based on the first exposure and the at least one second exposure.

15. The method of claim 14, wherein generating the image of the scene comprises:
determining a spectrum of interest;
segmenting the first exposure to create a first image slice having the spectrum of interest;
segmenting the at least one second exposure to create a second image slice having the spectrum of interest; and
stitching together the first image slice and the second image slice to form the image of the scene having the spectrum of interest.

16. The method of claim 15, further comprising generating a second image of the scene having a second spectrum of interest and creating a multispectral datacube that comprises the image of the scene having the spectrum of interest and the second image of the scene having the second spectrum of interest.

17. The method of claim 14, wherein the multispectral optical filter has spectral bands and determining the sampling distance is based at least in part upon the speed of the apparent motion, the spectral bands of the multispectral optical filter, and a spectrum of interest.

18. The method of claim 14, wherein the imaging system is on board a spacecraft and the method further comprises:
inputting at least the first exposure and the at least one second exposure as an input to an image analysis algorithm;
creating, based at least in part on executing the image analysis algorithm, a numerical value;
storing the numerical value; and
transmitting the numerical value to a remote location.

19. The method of claim 18, wherein creating the numerical value comprises creating one or more numerical values for each of a plurality of pixels that make up at least a portion of the first exposure or the at least one second exposure, or both.

* * * * *